United States Patent Office 3,483,210
Patented Dec. 9, 1969

3,483,210
CATALYZED OXIDATIVE CONVERSION OF AMINE METHYL GROUPS TO AMINE FORMYL GROUPS
David H. Rosenblatt, 3316 Old Forest Road, Baltimore, Md. 21208, and George T. Davis, 2 N. Reed St., Bel Air, Md. 21014
No Drawing. Filed June 1, 1967, Ser. No. 643,330
Int. Cl. C07c 103/02, 103/36
U.S. Cl. 260—294.7
8 Claims

ABSTRACT OF THE DISCLOSURE

A process of preparing an amide by the catalytic oxidation by means of oxygen or air of a tertiary amine.

---

Our invention relates to a process wherein the side chain of a tertiary amine is oxidized in the presence of a member of the platinum metal group and air or oxygen to produce an amide. More particularly our invention may be set forth by the general reaction:

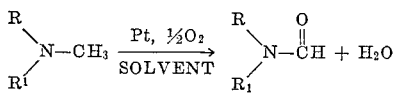

$$\underset{R^1}{\overset{R}{\diagdown}}N-CH_3 \xrightarrow[\text{SOLVENT}]{Pt,\ \frac{1}{2}O_2} \underset{R_1}{\overset{R}{\diagdown}}N-\overset{O}{\overset{\|}{C}}H + H_2O$$

wherein R and $R_1$ are radicals selected from the group of radicals consisting of methyl, benzyl, piperidyl, and —$CH_2$—alkyl; R and $R_1$ being taken together when piperidyl is employed.

Catalytic oxidation of primary and secondary amines has been disclosed in the prior art, but no disclosure exists regarding the catalytic oxidation of tertiary amines as in the invention herein disclosed.

Upon oxidizing a tertiary amine, one would expect an amine oxide to form. However, it has been unexpectedly discovered that oxidation of a tertiary amine by oxygen or air in the presence of a transition metal catalyst oxidizes the side chain to produce an amide.

The object of this invention is to provide a process which is superior to the prior processes of formylation of secondary amines through the utilization of milder operating conditions and cheaper reagents.

In accordance with our invention, a tertiary amine was dissolved in an appropriate solvent, such as benzene, in the presence of a metal catalyst of the platinum metal group and under an air or oxygen atmosphere. The reaction produced nearly quantitative yields at room temperature. Upon completion of the reaction, the solution was filtered to remove the catalyst. Subsequent removal of the solvent yielded an amide product substantially free of any by-products.

The following examples are not intended to limit the scope of our invention, but merely to illustrate our inventive process.

Example 1

One gram of platinum catalyst per 10 ml. of solution was added to a 0.2 molar solution of N-methyl-piperidine in benzene and the solution stirred for 16–20 hours. The stirring was carried out at room temperature and under an oxygen atmosphere. Upon completion of the stirring, the solution was filtered to remove the catalyst. After catalyst removal, the solvent was separated from the reaction product, established to be N-formyl piperidine by gas-liquid chromatography and comparison of infrared spectra with an authentic specimen.

Example 2

One gram of platinum catalyst per 10 ml. of solution was added to a 0.2 molar solution of N,N-dimethyl benzylamine in benzene and the solution stirred for 16–20 hours. The stirring was carried out at room temperature and under an oxygen atmosphere. Upon completion of the stirring, the solution was filtered to remove the catalyst. After catalyst removal, the solvent was separated from the reaction product, established to be N-benzylformamide by gas-liquid chromatography and comparison of infrared spectra with an authentic specimen.

Example 3

One gram of platinum catalyst per 10 ml. of solution was added to a 0.2 molar solution of trimethylamine in benzene and the solution stirred for 16–20 hours. The stirring was carried out at room temperature and under an oxygen atmosphere. Upon completion of the stirring, the solution was filtered to remove the catalyst. After catalyst removal, the solvent was separated from the reaction product, established to be dimethylformamide by gas-liquid chromatography and comparison of infrared spectra with an authentic specimen.

Example 4

One gram of a 15% palladium-on-charcoal catalyst per 10 ml. of solution was added to a 0.2 molar solution of N-methyl-piperidine in benzene and the solution stirred for 16–20 hours. The stirring was carried out at room temperature and under an oxygen atmosphere. Upon completion of the stirring, the solution was filtered to remove the catalyst. After catalyst removal, the solvent was separated from the reaction product, established to be N-formyl piperidine by gas-liquid chromatography and comparison in infrared spectra with an authentic specimen.

We claim:
1. A process for the preparation of amides comprising the steps of preparing a solution of a tertiary amine having a side chain methyl group in a solvent, adding a platinum group transition metal catalyst to the solution, stirring said solution, said stirring being carried out in an atmosphere selected from air and oxygen, filtering said solution after said amine has been converted to an amide reaction product to remove said catalyst, and separating said solvent from said reaction product.
2. The process according to claim 1 wherein said amine is selected from the group consisting of N,N-dimethyl benzylamine, N-methyl-piperidine, and trimethylamine.
3. The process according to claim 1 wherein said solution is 0.2 molar.
4. The process according to claim 1 wherein said solvent is benzene.
5. The process according to claim 1 wherein one gram of catalyst per 10 ml. of solution is added.
6. The process according to claim 5 wherein the catalyst is platinum.
7. The process according to claim 5 wherein the catalyst is 15% palladium-on-charcoal.
8. The process according to claim 1 wherein the stirring is carried out at room temperature.

References Cited

UNITED STATES PATENTS 3,385,891   5/1968   Fenton _____ 260—561

OTHER REFERENCES

Smith's College Chemistry, by William F. Ehret, seventh edition, p. 790, 1960.

HENRY R. JILES, Primary Examiner

S. D. WINTERS, Assistant Examiner

U.S. Cl. X.R.

260—561, 562, 687